United States Patent [19]

Black et al.

[11] Patent Number: 5,114,218
[45] Date of Patent: May 19, 1992

[54] LIQUID CRYSTAL SUNGLASSES WITH SELECTIVELY COLOR ADJUSTABLE LENSES

[75] Inventors: Michael Black, Foster City; Vladimir Kupershmidt, Fremont, both of Calif.

[73] Assignee: Reliant Laser Corp., Foster City, Calif.

[21] Appl. No.: 640,042

[22] Filed: Jan. 11, 1991

[51] Int. Cl.$^5$ .................................................. G02C 7/10
[52] U.S. Cl. ....................................... 351/44; 351/41; 351/158
[58] Field of Search ...................... 351/41, 158, 44, 45, 351/46, 47, 48, 49; 359/41, 57, 58, 64, 66, 67, 68, 84, 85; 2/432

[56] References Cited

U.S. PATENT DOCUMENTS

| | | |
|---|---|---|
| 4,201,450 | 5/1980 | Trapani . |
| 4,279,474 | 7/1981 | Belgorod ............................... 351/44 |
| 4,511,225 | 4/1985 | Lipson . |
| 4,595,262 | 6/1986 | Ogle . |
| 4,703,522 | 11/1987 | Shurle . |
| 4,786,125 | 11/1988 | Magarinos . |
| 4,802,719 | 2/1989 | Magarinos . |
| 4,835,796 | 6/1989 | Weider . |
| 5,015,086 | 5/1991 | Okaue et al. ......................... 351/44 |

*Primary Examiner*—Rodney B. Bovernick
*Attorney, Agent, or Firm*—D. Pressman

[57] ABSTRACT

LC sunglasses with selectively color adjustable lenses comprising an energy cell (30) attached to one butt-strap (22) of a rim (10), a color changing switch (28) supported by another butt-strap (24), a memory chip (26) supported by a bridge portion (16) of the glasses rim, and lenses (12 and 14) of a laminated structure. Each lens consists of a color mosaic mask (43), an input polarizing plate (44), a liquid crystal cell (50) sandwiched between voltage-controlled active matrices (52a and 52b), and an output polarizing plate (46). When the wearer of the sunglasses wants to change the color of the lenses (12 and 14), he/she installs the switch (28) into the position of a selected color, whereby the battery cell (30) is electrically connected with respective pixel sets of the active matrices (52a and 52b) via the memory chip (26). As a result, the lenses will pass only the component of the white light (W) which corresponds to the selected color.

20 Claims, 5 Drawing Sheets

Fig.5 ion of a pair of sunglasses of the invention is shown in FIG. 1.

LIQUID CRYSTAL SUNGLASSES WITH SELECTIVELY COLOR ADJUSTABLE LENSES

BACKGROUND

Field of the Invention

The present invention relates to eyeglasses, particularly to liquid crystal sunglasses with selectively color adjustable lenses.

CROSS REFERENCE TO RELATED APPLICATION

The present invention relates to our previous patent application Ser. No. 07/626,307, filed Dec. 12, 1990 now U.S. Pat. No. 5,076,669 granted Dec. 31, 1991, and entitled "Method and Apparatus for Selectively Blocking Light Beams of Different Wavelengths with Single Color Filter".

Background
Description of Prior Art

Sunglasses which protect eyes against direct sun rays nowadays find wide application and are used by people on sunny beaches, skiing resorts, etc.

In order to make such sunglasses more attractive, some manufacturers produce such glasses with interference films on the surfaces of glass lenses. Such intereference films produce an iridescent effect, i.e., a rainbow color effect which is visible only to an outside viewer and does not obstruct the vision of the wearer.

Other sunglasses employ tinted glass. Regardless of the type of coloring used, all existing sunglasses are designed for filtering out only a predetermined narrow range of colors or wavelengths, i.e., a predetermined component of white light. Therefore sunglasses which are designed for filtering out bright white light, reflected, e.g., by snow, are effective for shorter visible wavelengths and thus are inefficient for use against e.g., sunset light which consists basically of red components.

Thus when a wearer experiences sunny weather in mountains with a light brown landscape, or a desert area with yellowish colors, such sunglasses are ineffective since they filter out too much light and thus obstruct the wearer's vision.

In other words, each time the environment is changed, the wearer's sunglasses may become unsuitable for the new environment.

OBJECTS AND ADVANTAGES OF THE INVENTION

It is therefore a principal object and advantage of the invention to solve the above problem by providing sunglasses which are suitable for many types of environmental light, i.e., whether the predominant wavelength or color of the ambient light is from snow, brown landscape, or sunset conditions. Other objects and advantages are to provide sunglasses with selectively color adjustable lenses. Further objects are to provide glasses which are universal in use, which have an attractive appearance, and which can be used for entertainment or as a toy for children. Still further advantages and features will become apparent from a consideration of the ensuing description and drawings.

REFERENCE NUMERALS USED IN THE DESCRIPTION AND DRAWINGS

10—rim
12, 14—lenses
18, 20—temples
22, 24—butt-straps
26—electronic control unit
26$a$1, 16$b$1—terminals of the control unit
38—color changing switch
28-1—position of the color changing switch for orange color
30—power source
34, 36, 38, 40, 42—lead wires
43—color mask
44—input polarizing plate
46—output polarizing plate
48—optical path
50—liquid crystal cell
50$a$, 50$b$—precision glass plates
51$a$, 51$b$—polymer films
52$a$, 52$b$—transparent matrices
54—liquid crystals
56$a$1, 56$l$2, . . . , 56$a$n, 56$b$1, 56$b$2, . . . , 56$b$n—pixels
58$a$1, 58$b$2, . . . , 58$b$n, 58$b$1, 58$b$2, . . . , 58$b$n—terminals
59$a$1, 59$b$1—lead wires
62-1—orange color cells
62-3—green color cell
W—white incident light

Figure 1:
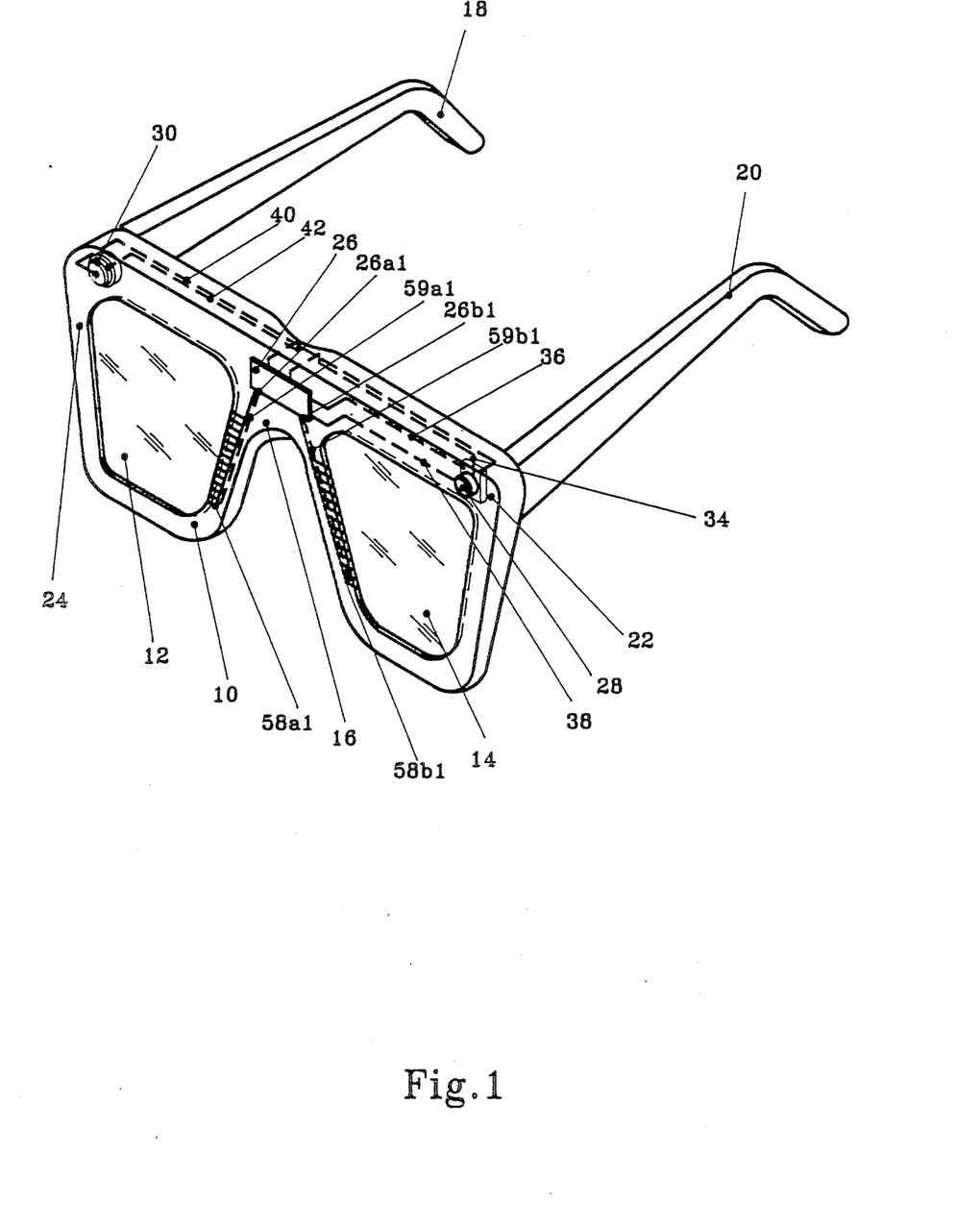
FIG. 1 is a perspective view of a pair of liquid crystal sunglasses of the invention.

FIGS. 1—Structure of Glasses

A perspective general view of a pair of sunglasses of the invention is shown in FIG. 1.

Similar to conventional glasses, the sunglasses have a rim 10 which supports lenses 12 and 14, and a bridge 16. Temples 18 and 20 are connected to the rim by respective hinges (not shown). The portions of the rim on which the hinges for temples 18 and 20 are mounted are known as butt-straps. In FIG. 1 such butt-straps are designated by reference numerals 22 and 24.

The eyeglasses has several parts embedded into the plastic material of rim 10. It is preferable that the parts be invisible or inconspicuous. For this purposes, these parts should either have the same color as the rim should be molded of a dark plastic. Alternatively the parts can have a complementary or highly contrasting color for design purposes.

The embedded parts are the following: an electronic control unit 26, such as an electronic memory chip, located over bridge 16, a color changing switch 28 located in righthand butt-strap 22, and a power source, located in lefthand butt-strap 24.

Lenses 12 and 14, which will be described in detail later, comprise a laminated structure which contains activated color-control transparent liquid crystals having terminals (not shown) connected to respective terminals (not shown) of memory chip 26 by lead wires in rim 10. Memory chip 26 is connected to switch 28 by lead wires 34, 36, and 38 on the top of rim 10. The number of the latter wires corresponds to the number of colors which can be reproduced in lenses 12 and 14.

In the illustrated embodiment, lenses 12 and 14 can be switched between orange, green, and blue. Therefore only three wires 34, 36, and 38, are shown. Two additional wires are embedded in the material of rim 10, i.e., a lead wire 40 which connects power source 30 to switch 28, and a lead wire 42 which connects power source 30 to memory chip 26.

Now the structure of lenses 12 and 14 will be described in detail. Since both lenses are identical in internal structure and differ only in shape, only one lens, e.g., lens 12, will be described. Furthermore, since the lenses relate to the field of polarizing optics, prior to their description and for better understanding of the terminology used in the specification, it will be helpful to explain the structure of typical elements of a blocking filter utilizing polarizing optics.

Polarization Optics

It is known that if a light is passed through a polarization element, e.g., a polarization plate, the direction of the electrical field of the light will become oriented parallel to the optical axis of the polarization plate. In other words, the light becomes polarized.

If a second polarization plate is installed parallel to the first plate and in the optical path of the polarized light, the polarized light will pass through the second plate only if the optical axis of this second plate is aligned with that of the first one. If the optical axes of the plates are 90° apart (crossed polarizers), the polarized light will be blocked by the second polarization plate.

The intensity of the light passed through both plates can be varied between full transmission and full blocking by changing the relative angle between the optical axes of both plates from 0° to 90°.

Those polarizers which have their axes adjustable with respect to each other are known as tunable polarizers. Tunable polarizers find wide application in electro-optics, e.g., in a voltage-controlled liquid crystal retarder which is a device consisting of an input polarizer, an alignment plate, a liquid crystal, and an output polarizer. See, e.g., "Properties of Tunable Nematic Liquid Crystal Retarders" by Scott E. Gilman, et al., (Meadowlark Optics, Longmont, Colorado), and Narendra K. Shankar, Transactions of Cornell University, School of Electrical Engineering, Ithaca, New York), 1990. All four elements of the system are arranged sequentially on the same optical path. The input polarizer polarizes the white incident light. The alignment plate and liquid crystal are used as an integral unit and rotate the optical axis of the polarized light by means of a voltage applied to the liquid crystal, while the output polarizer passes the light treated by the system.

However, this tunable retarder is applicable for blocking light of a given wavelength and cannot be used for selectively blocking lights of different wavelengths. For example, if the light is a mixture of green and red components, the aforementioned tunable retarder cannot block only green and pass only red light.

Figure 2:
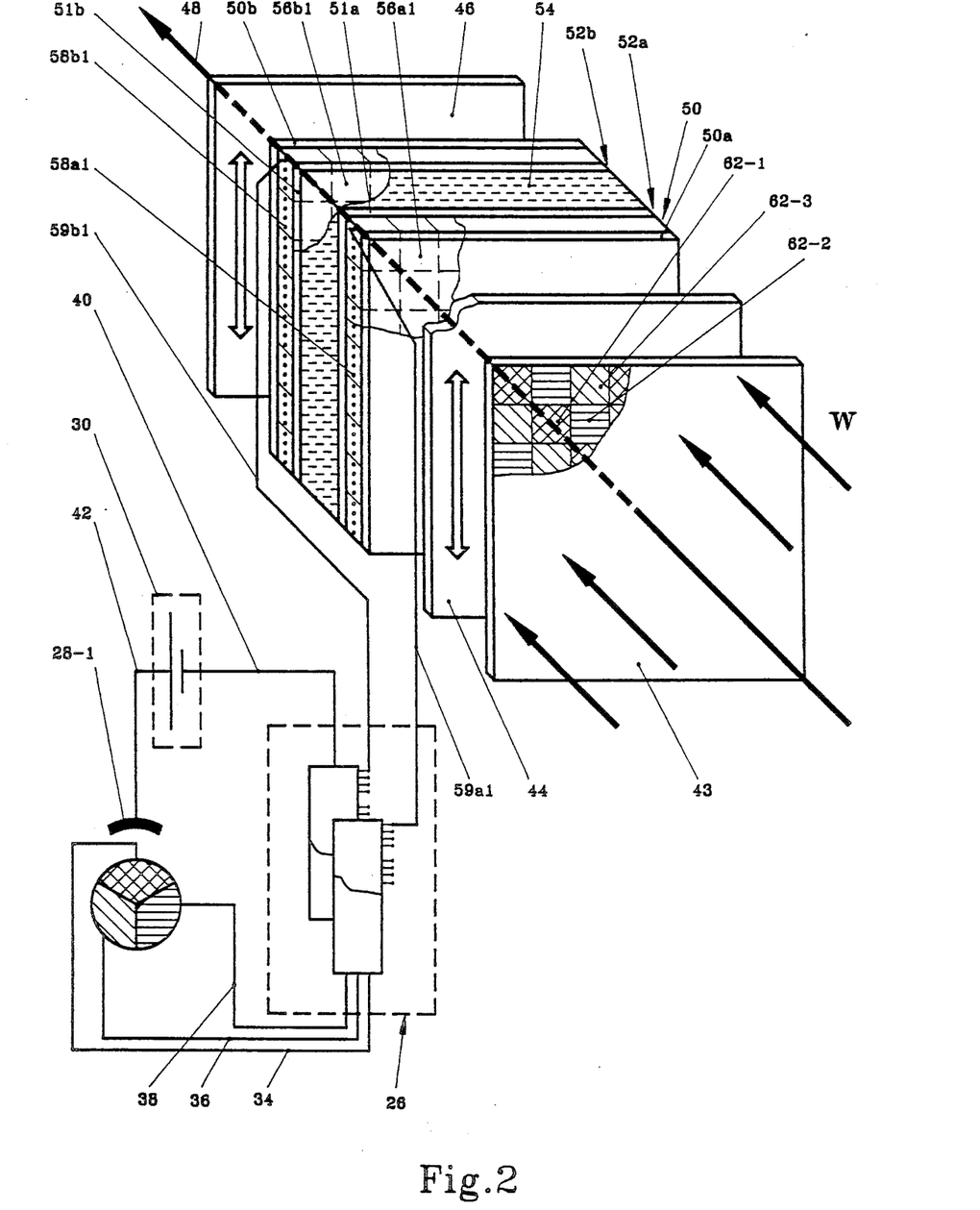
FIG. 2 is a perspective schematic view of an optical system of the glasses for selectively blocking lights of different colors or wavelengths with the use of a single color-sensitive filter.

FIG. 2—Lens Structure

As shown in FIG. 2, lens 12 (shown as having a square shape for purposes of ease of illustration) consists of a color mask 43, an input polarizing plate 44 and an output polarizing plate 46. The optical axes of both plates are parallel. In all the drawings, the directions of polarization are shown by double-pointed arrows.

Plates 44 and 46 are located on a common optical path 48. In the illustrated example, plate 44 polarizes white incident light in the vertical (Y) direction, while plate 46 also passes this light because its optical axis is parallel to that of plate 44. The optical axes of the polarization plates are never changed.

Arranged between polarizing plates 44 and 46 is a liquid crystal (LC) cell 50 which is formed by two precision glass plates 50a and 50b. The inner surface of each of glass plates 50a and 50b is coated with a thin transparent matrix 52a and 52b, respectively, while the later, in turn, is coated with a respective polymer film 51a and 51b.

The space between polymer films 51a and 51b is filled with an LC 54 which looks like a transparent solution with molecules which can be mechanically aligned (to form a uniaxial layer) and electrically rearranged (Photonics Spectra, April 1990, p. 82) to change the polarization direction.

Each matrix 52a and 52b is made of an electrically conductive transparent material and is divided into individual isolated pixels (microscopic cells) 56a1, 56a2 . . . , 56an (matrix 52a), 56b1, 56b2, . . . , 56bn (matrix 52b). These pixels can be individually addressed and controlled through terminals 58a1, 58b1, 58a2, 58b2, 58an . . . , 58bn, where terminals designated by "a" relate to active matrix 52a and terminals designated by "b" relate to active matrix 52b (only terminals 58a1 and 58b1 are shown in FIG. 2, since "n" may be a very large number).

Each pixel is activated by a voltage supplied to it via a respective terminal. For example, pixel 56a1 is activated through terminal 58a1 and pixel 56b1 is activated through terminal 58b1. The pixels are activate in pairs, i.e., a pair of pixels located opposite each other and symmetrical to LC cell 50 are activated simultaneously through respective terminals.

Although in the drawings each oppositely arranged pixel of the pair is designated by reference numeral 56 with a respective letter "a" or "b" (i.e., 56a and 56b), further in the description only one reference numeral 56 will be used for the simplicity, keeping in mind that in reality this refers to a pair of oppositely arranged pixels.

When no voltage is applied to a given pixel, light passing through this pixel is turned by 90 with respect to the direction of polarization provided by input plate 44. Therefore, this light will be blocked by output polarization plate 46. As a result, no light will pass through this given pixel.

When a voltage exceeding a threshold ensuring switching of the direction of polarization by this pixel is applied, the pixel will pass the polarized white incident light and will not change the direction of its polarization. Such light will pass through output plate 46 and will reach a respective cell of color mask 43 which will be described alter.

Each terminal on the matrix is connected to a respective terminal on electronic memory chip 26 (FIG. 1). For example, terminal 58a1 (FIGS. 1 and 2) of matrix 52a is connected to terminal 26a 1 of memory chip 26 by lead wire 59a1, while terminal lead 58b1 of matrix 52b is connected to terminal 26b1 of memory chip 26 by lead wire 59b1, etc. Only two such connections are shown in FIGS. 1 and 2 for simplicity of the drawings. In reality, each pixel is controlled and directly addressed from memory chip 26 through an individual lead wire.

Memory chip 26 is an electronic device which supplies the voltage of power source 30 selectively to respective pixels, depending on the position of switch 28. Such chips are known in the art and are used in flat panel color TV displays for storing and controlling color pixels.

The first element of the lens of FIG. 2 in the path of white incident light W is color mask 43. Mask 43 comprises a plate in a plane parallel to LC cell 50 and consists of individual color cells 62-1, 62-2, ..., 62-n. Each color cell 62-1, 62-2, ..., 62-n has the same dimensions as respective pixel pair 56a1 and 56b1, 56a2 and 56b2, ..., 56an and 56bn. Each color cell is also an exact projection of a respective pixel pair onto color mask 43.

Figure 3:
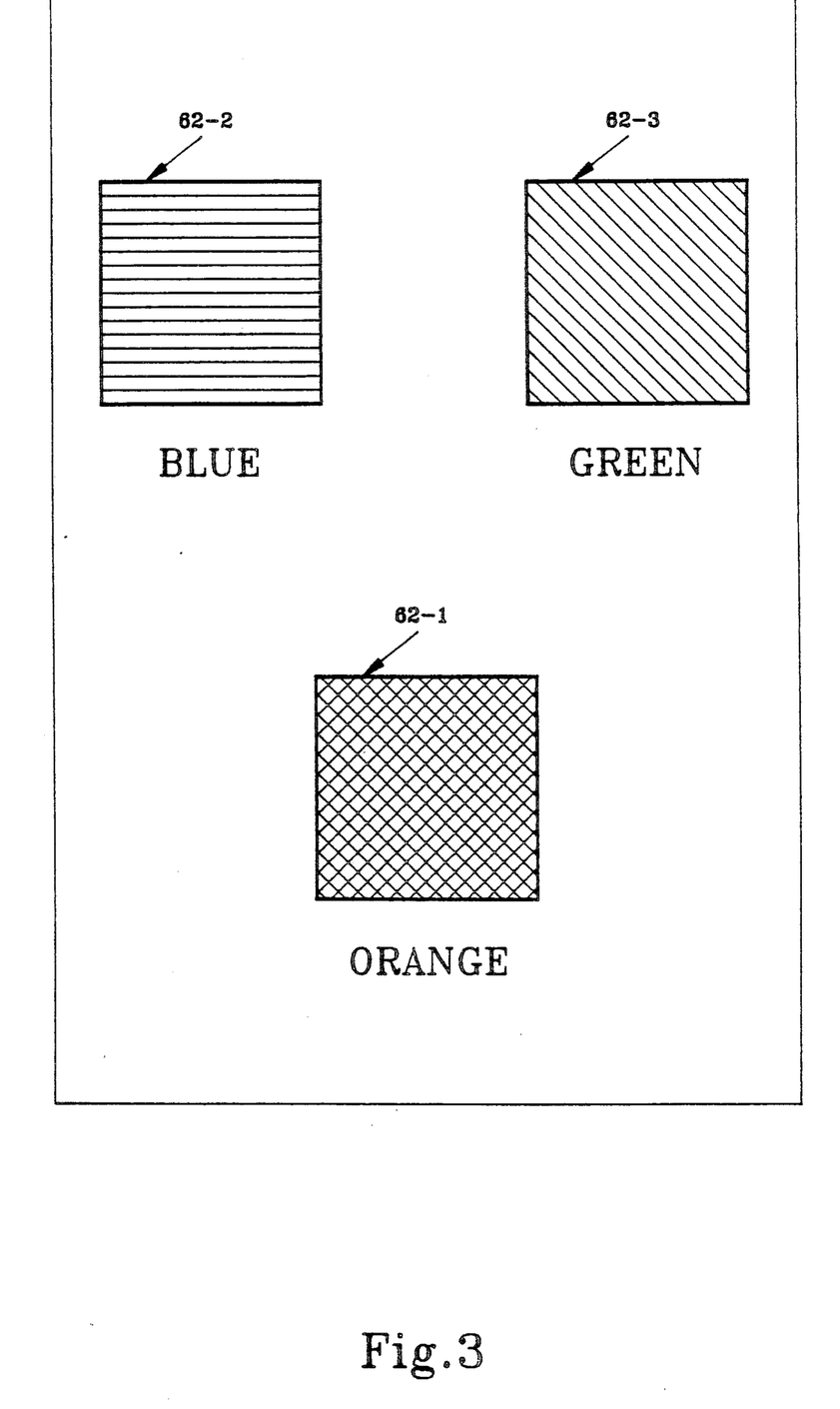
FIG. 3 designates hatchings used for various colors used in the optical system of the glasses.

Mask 43 is a mosaic of periodically arranged cells of different colors. For example, color cell 62-1 is orange, color cell 62-2 is blue, and color cell 62-3 is green. In view of the fact that the drawings are printed in black-and-white, the different colors are designated by the hatchings shown in FIG. 3. Although only three different colors are shown, in practice that mask may have cells of less than three or more than three colors. Also for simplicity, the operation of the mask will be illustrated with reference only to a group of adjacent cells which will be shown in respective color code, while the colors of the remaining cells will not be shown.

Individual pixels 56a1, 56b1, 56a2, 56b2 ..., and thus color cells 62-1, 62-2, ..., have small dimensions. E.g., with a range of 20 to 100 cells per centimeter, when mask 43 passes through its respective cells the light of a predetermined color, a human eye can see the entire lens in a continuous monochromatic color without visible degradation into cells. This principle is used in conventional color TV tubes whose surface consists of a plurality of color dots.

Each color cell is made of a material selectively transparent to a light of a given wavelengths. It can be a color glass, color polymer, etc. In other words, each color cell is a color filter, preferably a narrow-band color filter. Technically such a mosaic-type mask can be prepared by merely assembling the entire unit from elementary color cells, or each cell can be prepared photolithographically by selectively exposing, etching, and processing a multiple-layer plate.

Thin-film indium-tin oxide, which is the basic material of active matrix 20, is produced, e.g., by Tosoh SMD Co., Japan. The company produces one-piece film from 50.8 mm to 304.8 mm in diameter up to 127—254 mm.

Some materials mentioned above are used in the latest technology by a number of companies (Hitachi America Ltd., Illinois, Optical Imaging Systems Inc., Michigan, and others) for the production of active-matrix liquid-crystal displays (AMLCD), e.g., for color TV or color projection screens.

At the present time, all materials and optical elements required for reducing the invention to practice are available on the market and produced commercially. For example, thin-film linear polarizers and LC cells are produced by Medowlark Optics, supra. The polarizers are manufactured with diameters in the range of 3.17 mm to 50.8 mm, and with thicknesses within the range of 2.61 mm to 12.77 mm. The same products are manufactured many other optical companies.

To an external viewer, mask 43 will look like a color mosaic which makes the glasses more attractive in appearance and increases their commercial value.

Lens 12 is about 5 cm by 5 cm across and about 3 to 5 mm thick. Mask 43 has from 400 to 10000 cells per sq. cm. of its surface.

FIGS. 1, 2, 4, and 5—Operation

The principle of changing colors of lenses used in the sunglasses of the invention 1 will now be described with reference to FIGS. 1, 2, 4, and 5.

Figure 4:
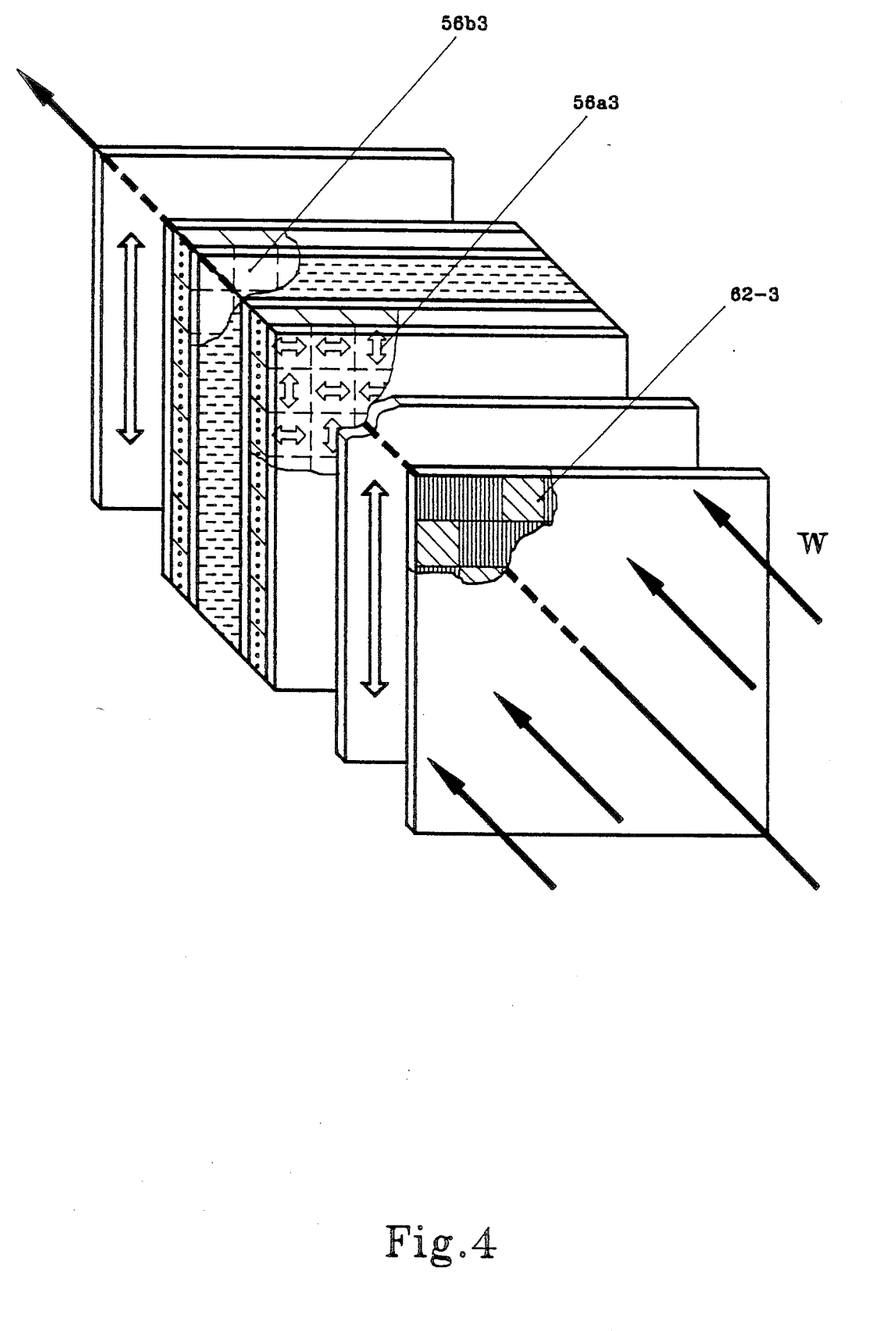
FIG. 4 is the same view as in FIG. 2, but illustrating the filtering of orange light.
Figure 5:
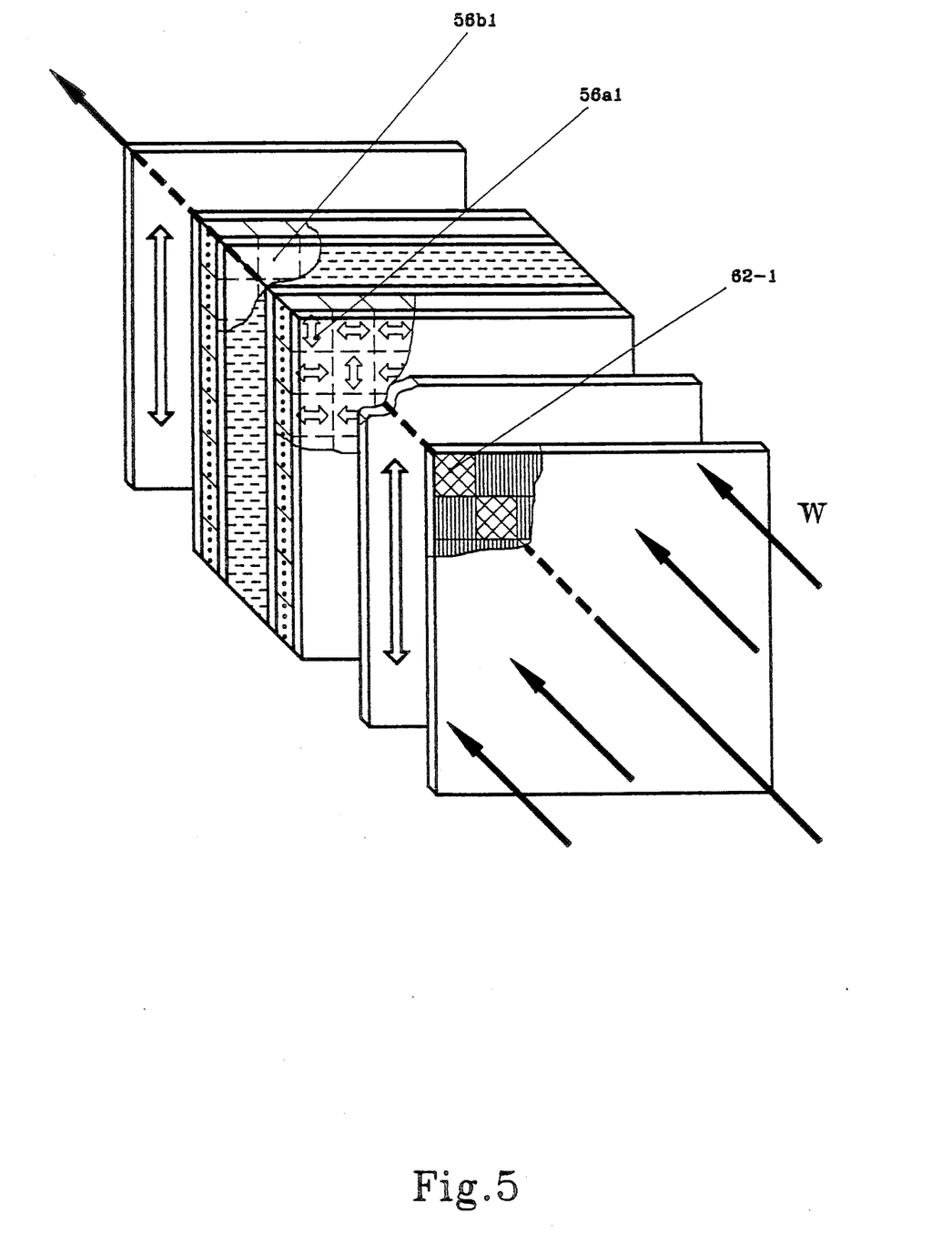
FIG. 5 is the same view as in FIG. 2, but illustrating the filtering of green light.

FIG. 4 is the same view as in FIG. 2, but illustrating the filtering of orange light, while FIG. 5 is the same view as in FIG. 2, but illustrating the filtering of green light.

Although FIGS. 4 and 5 are in general are the same as FIG. 2, for simplicity of the drawings, they do not show power source 30, color changing switch 28, memory chip 26 and their respective terminal leads.

Let us assume that lenses 12 and 14 are switched to an orange color, so that the wearer sees everything as through an orange filter. To do this, switch 28 (FIG. 1) is put into a position 28-1 (FIG. 2).

More specifically, incident white light W falls onto color mask 43, and, when the light passes though all color cells 62-1, 62-2, ..., 62-n of this mask, each color cell allows only light of its color to pass. The light filtered by mosaic mask 43 then passes through input polarizing plate 44, and is converted into polarized light which falls onto front active matrix 52a. When switch 28 is put into position 28-1 corresponding to orange, voltage signals generated by power source 30 will be supplied through wires 40 and 42 to selective pixels 56a1 and 56b-1.

When this voltage is applied to pixels 56a1 and 56b1, molecules of the LC located between these particular pixels will be rearranged in such a manner that the direction of polarization of light passing through this pixel will remain unchanged. As a result, the pixels will pass the polarized white incident light to output polarization plate 46. As the latter has the same polarization direction as input polarization plate 44 and the light, the latter will not be blocked by plate 46, will reach a respective orange cell 62-1, and then will pass through this cell unobstructed. As a result, the wearer of the sunglasses will see everything in orange, since other color components of the white incident light will be blocked by output polarization plate 46.

When the wearer wants to change the color, e.g., from orange to green, he/she switches switch 28 into position corresponding to green color (not shown).

In this position, incident white light W falls onto color mask 43, and, when the light passes though all color cells 62-1, 62-2, ..., 62-n of this mask, each color cell again filters the light in accordance with its color. The light filtered by mosaic mask 43 then passes through input polarizing plate 44, and is converted into polarized light which falls onto front active matrix 52a. In the position of switch 28 corresponding to green voltage signals generated by power source 30 will be supplied through wires 40 and 42 to selective pixels 56a3 and 56b-3.

When this voltage is applied to pixels 56a 3 and 56b 3, molecules of the LC located between these particular pixels will be rearranged in such a manner that the direction of polarization of light passing through this pixel will remain unchanged. As a result, the pixels will pass the polarized white incident light to output polarization plate 46. As the latter has the same polarization direction as input polarization plate 44 and the light, the latter will not be blocked by plate 46, and will reach a respective green cell 62-3, and will then pass through this cell unobstructed. As a result, the wearer of the sunglasses will see everything in green, since other color components of the white incident light will be blocked by output polarization plate 46.

The sunglasses of the type described above may find various applications. For example, when a wearer of the sunglasses of the invention drives a car through a sandy landscape on sunny day, he/she presses the button of color changing switch 28 until lenses 12 and 14 tuned into a desired color, e.g., orange. In snow, where the ambient light has the shorter wavelengths, e.g., blue and violet, the user should switch the glasses so that they are colored green.

Children can use the sunglasses of the invention as a toy. E.g., they can mask pictures drawn by a green pencil by switching the lenses to green. At the same time they will be able to see pictures drawn by pencils of other colors.

It is understood that these applications were given only as examples, and that many other applications are possible.

SUMMARY, RAMIFICATIONS, SCOPE

Thus, it has been shown that we have provided liquid crystal sunglasses with selectively color adjustable lenses. The glasses are universal in use, have an attractive appearance, and besides their utility purposes can be used for entertainment or as a toy for children.

Although the glasses have been shown and described in the form of one specific embodiment, this embodiment, its parts, materials, and configurations have been given only as examples. Many other modifications of active matrices, LC cell, and color mask are possible. The color mask may contain cells of less or more than three colors and the mosaic can be composed of greater or smaller number of color cells than that shown in FIGS. 2, 4, and 5. The color mask can be installed behind the output plate rather than in front of the input polarizing plate, as shown in the drawings. The power source may comprise a conventional replaceable battery cell of the type used in electric watches. If necessary, the power source can be located remotely, e.g., in the wear's pocket, and connected to the chip and switch by thin wires.

Therefore, the scope of the invention should be determined, not by the example given, but by the appended claims and their legal equivalents.

What we claim is:

1. Liquid crystal sunglasses with at least one selectively color adjustable lens comprising:
    a rim and a bridge portion which support said lens;
    a pair of temples supported by said rim;
    a voltage power source; and
    an electronic control unit connected to said power source;
    a color changing switch connected to said power source and to said electronic control unit, said switch being switchable between a plurality of color positions;
    said color adjustable lens comprising a laminated structure composed of a color mosaic mask, an input polarizing plate, a liquid crystal cell sandwiched between a pair of voltage-controlled active matrices, and an output polarizing plate;
    said mask, said input polarizing plate, said liquid crystal cell with said active matrices, and said output polarizing plate being arranged sequentially in the direction of incident light;
    said active matrices being electrically connected to said control unit.

2. The liquid crystal sunglasses of claim 1 wherein said electronic control unit comprises a memory chip.

3. The liquid crystal sunglasses of claim 1 wherein said electrical connections between said power source, said color changing switch, said electronic control unit, and said active matrices comprises lead wires embedded in the material of said rim.

4. The liquid crystal sunglasses of claim 3 wherein said rim is made of a material which makes said electrical connections invisible.

5. The liquid crystal sunglasses of claim 1 wherein said mosaic color mask is composed of a plurality of periodically arranged color cells, so that, when components said white incident light pass through said input polarizing plate, they are selectively filtered in accordance with their color.

6. The liquid crystal sunglasses of claim 5 wherein each of said active matrices is made of an electrically conductive transparent material and is divided into a plurality of individual isolated pixels, said pixels being combined into sets, each set corresponding to a predetermined color, said switch being arranged to connect said power source with a selected set of said pixels via said control unit for each of its respective color positions.

7. The liquid crystal sunglasses of claim 6 wherein said mask, said input polarization plate, said liquid crystal cell, and said output polarization plate lie in parallel planes, said input and output polarization plates having the same direction of polarization.

8. The liquid crystal sunglasses of claim 7 wherein each of said pixels has a corresponding color cell in said mosaic color mask and wherein each of said color cells has the same dimensions as a projection of said pixel onto it.

9. Liquid crystal sunglasses with selectively color adjustable lenses, comprising:
    a rim with a first butt-strap and a second butt-strap, and a bridge portion which supports said lenses;
    a pair of temples hingedly supported by said rim;
    a voltage power source supported by one of said butt-straps;
    an electronic control unit supported by said bridge portion and connected to said power source;
    a color changing switch supported by a second of said butt-straps and connected to said power source and to said electronic control unit, said switch being switchable between a number of color positions;
    each of said color adjustable lenses comprising a laminated structure composed of a color mosaic mask, an input polarizing plate, a liquid crystal cell sandwiched between a pair of voltage-controlled active matrices, and output polarizing plate;
    said mask, said input polarizing plate, said liquid crystal cell with said active matrices, and said output polarizing plate being arranged sequentially in the direction of incident light;
    said active matrices being electrically connected to said control unit.

10. The liquid crystal sunglasses of claim 9 wherein said electronic control unit comprises a memory chip.

11. The liquid crystal sunglasses of claim 9 wherein said electric connections between said power source, said color changing switch, said electronic control unit, and said active matrices comprise lead wires embedded in the material of said rim.

12. The liquid crystal sunglasses of claim 11 with selectively color adjustable lenses wherein said rim is made of a material which makes said electrical connections invisible.

13. The liquid crystal sunglasses of claim 9 wherein said mosaic color mask is composed of a plurality of periodically arranged color cells, so that, when components said white incident light pass through said input polarizing plate, they are selectively filtered in accordance with their color.

14. The liquid crystal sunglasses of claim 13 wherein each of said active matrices is made of an electrically conductive transparent material and is divided into a plurality of individual isolated pixels, said pixels being combined into sets, each set corresponding to a predetermined color, said switch being arranged to connect said power source with a selected set of said pixels via said control unit for each of its respective color positions;

said mask, said input polarization plate, said liquid crystal cell, and said output polarization plate lie in parallel planes, said input and output polarization plates having the same direction of polarization.

15. The liquid crystal sunglasses of claim 14 wherein each of said pixels has a corresponding color cell in said mosaic color mask and wherein each said color cell has the same dimensions as a projection of said pixel onto it.

16. Liquid crystal sunglasses with selectively color adjustable lenses, comprising:

a rim and a bridge portion which supports said lenses; temples supported by said rim;

an energy cell;

a memory chip connected to said cell;

a color changing switch connected to said energy cell and to said memory chip, said switch being switchable between a number of color positions;

each of said color adjustable lenses comprising a laminated structure composed of a color mosaic mask, an input polarizing plate, a liquid crystal cell sandwiched between a pair of voltage-controlled active matrices, and an output polarizing plate;

said mask, said input polarizing plate, said liquid crystal cell with said active matrices, and said output polarizing plate being arranged sequentially in the direction of incident light;

said active matrices being electrically connected to said control unit;

said electrical connections between said power source, said color changing switch, said electronic control unit, and said active matrices comprising lead wires embedded in the material of said rim, said material making said electrical connections invisible.

17. The liquid crystal sunglasses of claim 16 wherein said mosaic color mask is composed of a plurality of periodically arranged color cells, so that, when components said white incident light pass through said input polarizing plate, they are selectively filtered in accordance with their color.

18. The liquid crystal sunglasses of claim 17 wherein each of said active matrices is made of an electrically conductive transparent material and is divided into a plurality of individual isolated pixels, said pixels being combined into sets, each set corresponding to a predetermined color, said switch being arranged to connect said power source with a selected set of said pixels via said control unit for each of its respective color position; said mask, said input polarization plate, said liquid crystal cell, and said output polarization plate lying in parallel planes, said input and output polarization plates having the same direction of polarization.

19. The liquid crystal sunglasses of claim 18 wherein each of said pixels has a corresponding color cell in said mosaic color mask and wherein each of said color cells has the same dimensions as a projection of said pixel onto it.

20. The liquid crystal sunglasses of claim 16 wherein said color mosaic mask is located behind said output polarizing plate in the direction of said white incident light.

* * * * *